Figure 1:

(No Model.)

H. BLAND.
HORSESHOE.

No. 255,919. Patented Apr. 4, 1882.

Witnesses:
Philip Mauro
Bartram Zevely

Inventor:
Henry Bland
by A. Pollok
his attorney

UNITED STATES PATENT OFFICE.

HENRY BLAND, OF LUTON, COUNTY OF BEDFORD, ASSIGNOR TO WILLIAM BROWN LASSCELL, OF LONDON, ENGLAND.

HORSESHOE.

SPECIFICATION forming part of Letters Patent No. 255,919, dated April 4, 1882.

Application filed November 23, 1881. (No model.) Patented in England January 18, 1881.

*To all whom it may concern:*

Be it known that I, HENRY BLAND, a subject of the Queen of Great Britain, and residing at Luton, in the county of Bedford, England, have invented certain improvements in appliances to be attached to the shoes or plates of animals to afford a better foothold, and in the method of securing the same therein, (for which I have obtained a patent in Great Britain, No. 226, dated January 18, 1881,) of which the following is a specification.

My said invention relates to a peculiar appliance to be attached to the shoes or plates of animals for the purpose of "roughing," or to afford a better foothold, also to the mode of securing the same in the said shoes; and it consists of a removable steel spike, commonly known as a frost "rough" or "cog," of the peculiar form and construction hereinafter described.

The shank of my improved rough or cog is round, and smooth on the surface, without screw-threads, has a taper from below upward of about an eighth of an inch in an inch and a half, and is without any shoulder or enlargement bearing on the under surface of the shoe. The tip, or that part of my improved rough or cog which projects below the under surface of the shoe, is flattened at its sides in order to afford a hole for a key or wrench for removing the cog. When required for light use the improved cog is made toward its outer end, by preference, of a round conical form; but when required for general purposes I prefer to make this part of a flattened shape, the face of the tip in the latter case having a rectangular form. These peculiar roughs or cogs are secured into the shoe by inserting them into smooth round holes specially made to receive them in the shoe or plate, such holes having a taper corresponding exactly to that of the shank of the rough or cog. The particular degree of taper in the shanks and holes hereinbefore mentioned affords the best and most secure hold to the cogs, while at the same time admitting of their being readily loosened by the wrench when requiring to be removed. The fact of the shanks of the roughs being made smooth, or without screw-threads or shoulders, affords the greatest amount of strength with a given weight of metal, all unnecessary or superfluous metal being dispensed with. The holes can be readily cleaned and prepared for the insertion of the roughs after the shoes or plates have been in use for any length of time by the aid of a correspondingly-tapered steel rymer or reamer.

In order that my said invention may be fully understood, I shall now proceed more particularly to describe the same, and for that purpose shall refer to the several figures in the explanatory sheet of drawings hereunto annexed, the same letters of reference indicating corresponding parts in all the figures.

Figure 2:
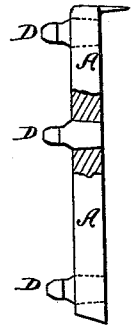
Figures 3, 4:
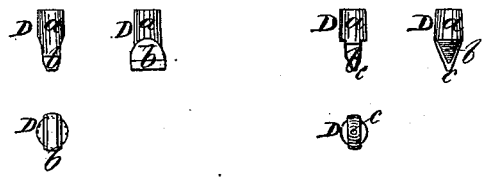

Figure 1 of my drawings represents a plan of the under side of an ordinary horseshoe having my improved roughs or cogs secured therein according to my said invention. Fig. 2 is a corresponding side elevation of the same, partly in section. Fig. 3 illustrates, in side and front elevation and plan, one of my improved roughs or cogs detached as adapted for general purposes or ordinary use. Fig. 4 represents similar views of the modified forms of rough or cog as adapted for light use.

A is the body of the horseshoe with the usual nail-holes, B B, shown therein.

Figures 5, 7:
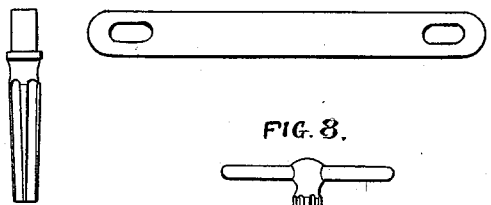
Figure 6:

At any convenient part or parts of the shoe I form one or more tapered holes (one of which is shown empty at C) of the size required, the wider ends of the said tapered holes being on the under face of the shoe, or that nearest the ground. These holes may be formed originally by drilling or in any other well-known manner, after which the particular taper required—namely, a taper equivalent to about one-eighth of an inch in a length of one and one-half inch—is produced by the aid of a rymer or reamer or tool of corresponding taper—such, for example, as is shown in side elevation and transverse section at Figs. 5 and 6. The holes, having been brought to the exact taper required and left smooth inside, are ready to receive the improved roughs or cogs D, four of which are shown fitted in position in Fig. 1. These roughs or cogs, as shown in Fig. 3, consist of a tapered shank, *a*, made smooth on the surface or sides—that is to say, without any screw-thread thereon—and tapered, so as to correspond exactly with the taper of the holes which receive them. The larger end of the tapered shank $a$, or that part which is next to the ground, is flattened, as shown at $b$, to receive a slotted tool or wrench—such, for example, as is shown at Fig. 7—for facilitating the removal of the cogs when required.

The extreme end of the flattened part $b$ is left plain on the surface, as will be readily seen on referring to the different views at Fig. 3. In the modified form of cog for light use shown at Fig. 4 the flattened part merges into the cone $c$ at the tip. This flattening of the sides of the outer end of the rough or cog is produced by stamping or forging the larger end of the original piece of metal forming the shank, and as no shoulder, enlargement, or collar is formed on the shank, it follows that my improved roughs or cogs are lighter in proportion to their strength than those heretofore employed. A light tap of the wrench, Fig. 7, on the tip of the cog after it has been inserted into its tapered hole suffices to secure it effectually in position, and its removal is as readily accomplished by fitting the slot of the wrench onto the flattened end $b$ and imparting a partial turn thereto.

Figure 8:
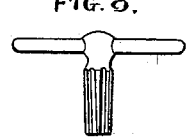

I have found in practice that the stumps of the worn out roughs may be advantageously utilized with a view to increasing the durability of the shoe in summer wear—more particularly in those cases in which a horse wears his shoes unequally—by inserting such stumps, hardened all through, into smooth tapered holes made to receive them between the nail-holes of the shoe at those parts most liable to wear, by which simple means I have been enabled to increase twofold the durability of a set of shoes. Any burr or roughness in the holes after use without the cogs can be removed by the small pocket tapered reamer shown at Fig. 8.

Having now described and particularly ascertained the nature of my said invention and the manner in which the same is or may be used or carried into effect, I would observe, in conclusion, that I am aware that heretofore horseshoes have been provided with detachable roughs or cogs set in round tapering holes in the shoe; but the cogs have been set at an angle, so that their upper ends come out near the edge of the shoe; and the horse's hoof has been notched above the openings for the cogs, so that the latter may be punched out from above. As these cogs cannot be removed from below, they cannot be used in the middle of a shoe, but can only be set at its ends; and they cannot be placed, as in the present invention, directly in the shoe-plate itself, but additional plates or projections have to be provided wherever a cog is set, in order to give a sufficient bearing to insure strength and steadiness, the inclination of the cogs tending to weaken them, as well as the shoe itself. By my invention all these disadvantages are overcome. The cogs being so constructed that they can be removed from below by a simple key or wrench, they can be set vertically, which is very important. The cutting away of the horse's hoof is avoided, and the cogs may be set at any point in the shoe. Moreover, in case it becomes necessary to have the horse "roughed" the cogs may be easily applied to a shoe of ordinary construction, the cogs being set directly in the shoe-plate without additional plates or projections, and may be as easily removed, leaving the shoe in condition for ordinary weather. I do not therefore claim broadly a horseshoe provided with round tapering cogs or roughs; but

What I do claim, and desire to secure by Letters Patent, is—

1. A horseshoe having a number of smooth round tapering cogs set therein, said cogs having their sides flattened toward their lower or projecting ends, so as to admit of removal by a suitable key or wrench, substantially as described.

2. The combination, with a horseshoe, of round tapering cogs or roughs, flattened at their lower ends, and set vertically in holes of corresponding shape made directly in the shoe-plate itself, so that when said roughs or cogs are removed the shoe is left plain and flat, as set forth.

In testimony whereof I have signed my name to this specification in the presence of two subscribing witnesses.

HENRY BLAND.

Witnesses:
 CHAS. MILLS,
 WM. GORTON,
 *Both of 47 Lincoln's Inn Fields, London.*